(12) United States Patent
Chang

(10) Patent No.: US 12,445,271 B2
(45) Date of Patent: Oct. 14, 2025

(54) ELECTRONIC DEVICE AND PUBLIC KEY REPLACEMENT METHOD THEREOF

(71) Applicant: Nuvoton Technology Corporation, Hsinchu Science Park (TW)

(72) Inventor: Wen-Shuo Chang, Hsinchu (TW)

(73) Assignee: NUVOTON TECHNOLOGY CORPORATION, Hsinchu Science Park (TW)

(*) Notice: Subject to any disclaimer, the term of this patent is extended or adjusted under 35 U.S.C. 154(b) by 101 days.

(21) Appl. No.: 18/425,434

(22) Filed: Jan. 29, 2024

(65) Prior Publication Data
US 2025/0132900 A1     Apr. 24, 2025

(30) Foreign Application Priority Data

Oct. 20, 2023  (TW) .................................. 112140090

(51) Int. Cl.
*H04L 9/40* (2022.01)
*H04L 9/08* (2006.01)

(52) U.S. Cl.
CPC .................. *H04L 9/0825* (2013.01)

(58) Field of Classification Search
CPC ........................ H04L 9/0825; H04L 9/0891
See application file for complete search history.

(56) References Cited

U.S. PATENT DOCUMENTS

| | | | |
|---|---|---|---|
| 2012/0066499 A1* | 3/2012 | Ali ...................... | G06F 21/305 713/170 |
| 2017/0010881 A1* | 1/2017 | Kawazu ................ | G06F 8/654 |
| 2019/0042228 A1 | 2/2019 | Nolan et al. | |
| 2022/0318439 A1* | 10/2022 | Albesa ................. | G06F 21/575 |
| 2022/0405392 A1* | 12/2022 | Nix ...................... | H04L 9/3249 |

FOREIGN PATENT DOCUMENTS

TW        201633207 A        9/2016

OTHER PUBLICATIONS

Office Action (with Search Report) issued in corresponding TW application No. 112140090 dated Mar. 26, 2024, (11 pages).

* cited by examiner

*Primary Examiner* — Thaddeus J Plecha
(74) *Attorney, Agent, or Firm* — Muncy, Geissler, Olds & Lowe, P.C.

(57) ABSTRACT

An electronic device includes an immutable memory, a counter, and a processor. The immutable memory stores a first public key and a second public key in advance, and the first public key and the second public key are unmodifiable. The counter has an anti-rollback protection and counts a counting value. When the counting value is a first value, the processor selects a first public key corresponding to the first value. When the counting value is a second value, the processor selects the second public key corresponding to the second value. When the counting value is a third value, the processor selects the first public key and the second public key. The first value and the second value are in a first state, and the third value is in a second state, where the first state and the second state are different.

20 Claims, 3 Drawing Sheets

ELECTRONIC DEVICE AND PUBLIC KEY REPLACEMENT METHOD THEREOF

CROSS REFERENCE TO RELATED APPLICATIONS

This Application claims priority of Taiwan Patent Application No. 112140090, filed on Oct. 20, 2023, the entirety of which is incorporated by reference herein.

BACKGROUND OF THE INVENTION

Field of the Invention

The present disclosure is generally related to an electronic device and a public key replacement method, and more particularly it is related to an electronic device with a plurality of public keys written in advance and a public key replacement method thereof.

Description of the Related Art

In order to ensure the security of system operation, the boot program initially executed by a system must have unchangeable characteristics to ensure the security of subsequent execution programs and the privacy of the user. In order to ensure security and privacy, in addition to the unchangeable boot process, a public key (Root of Trust Public Key, ROTPK) is also needed to verify the firmware signature.

Generally speaking, as long as the security of the private key (Private Key) can be ensured, the public key can be protected from being cracked. However, in practice, when the same public key is used for a long time, or is leaked due to poor management of the private key, it may allow the key to be cracked, thereby causing damage to the Root of Trust of the system.

In order to reduce the risk of the public key being cracked due to long-term use, and to remedy the vulnerabilities caused when the private key is leaked due to poor management, it is necessary to replace the public key to maintain the security of the system. In addition, since it not only causes additional risks during replacement of the public key, but it also because the system should be able to boot up after replacing the public key, a safe and effective public key replacement method is needed.

BRIEF SUMMARY OF THE INVENTION

An electronic device and a public key replacement method thereof is proposed herein, which breaks through the previous limitation that the public key cannot be changed. By pre-writing a plurality of public keys into a write-once memory and using the count value counted by a counter with anti-countdown protection as an index, the electronic device can sequentially use the plurality of public keys pre-written into the write-once memory. In addition, the electronic device can use the public key replacement method proposed by the present invention to smoothly transfer from the previous public key and firmware to the updated public key and firmware. During the transfer process, since the previous public key and the updated public key can be used at the same time, even if the update fails caused by a problem occurring during the update process, the electronic device can still use the previous public key with the previous firmware to continue the boot-up process.

In an embodiment, an electronic device is provided, which comprises an immutable memory, a counter, and a processor. The immutable memory stores a first public key and a second public key in advance, where the first public key and the second public key are unmodifiable. The counter has an anti-rollback protection and counts a count value. The processor selects the first public key, the second public key, or both based on the count value. When the count value is a first value, the processor selects the first public key corresponding to the first value. When the count value is a second value, the processor selects the second public key corresponding to the second value. When the count value is a third value, the processor selects the first public key and the second public key. The third value is the average of the first value and the second value, and the second value exceeds the first value. The first value and the second value are in a first state and the third value is in a second state. The first state and the second state are different.

According to an embodiment of the present invention, when the processor selects the first public key corresponding to the first value, the processor uses the first public key to verify a current firmware and determines whether the firmware passes the verification. When the processor determines whether the current firmware passes the verification, the processor executes the current firmware. When the processor determines that the current firmware does not pass the verification, the processor does not execute the current firmware.

According to an embodiment of the present invention, after the processor executes the current firmware, the processor determines whether the count value is in the second state. When the processor determines that the count value is not in the second state, the processor further determines whether to replace the first public key. When the processor determines to replace the first public key, the processor downloads an updated firmware and controls the counter to modify the count value from the first value to the third value. After the count value is modified to the third value, the processor reboots.

According to an embodiment of the present invention, after the processor reboots, the processor selects the first public key and the second public key based on the third value. After the processor selects the first public key and the second public key based on the third value, the processor determines whether the updated firmware is the same as the current firmware. When the processor determines that the updated firmware is not the same as the current firmware, the processor uses the second public key to verify the updated firmware and determines whether the updated firmware passes the verification.

According to an embodiment of the present invention, when the processor determines that the updated firmware does not pass the verification, the processor uses the first public key to verify the current firmware and determines whether the current firmware passes the verification. When the processor determines the current firmware passes the verification, the processor executes the current firmware.

According to an embodiment of the present invention, when the processor determines that the updated firmware passes the verification, the processor stores the updated firmware as the current firmware. After the processor stores the updated firmware as the current firmware, the processor reboots. After the processor reboots, the processor selects the first public key and the second public key based on the count value being the third value.

According to an embodiment of the present invention, the electronic device further comprises a non-volatile memory.

The non-volatile memory comprises a first address and a second address. The current firmware is stored in the first address. The updated firmware is stored in the second address. When the processor stores the updated firmware as the current firmware, the processor copies the updated firmware of the second address to the first address.

According to an embodiment of the present invention, after the processor reboots to select the first public key and the second public key based on the count value and when the processor determines that the updated firmware is the same as the current firmware, the processor uses the second public key to verify the current firmware and determines whether the current firmware passes the verification. When the processor determines that the current firmware passes the verification, the processor executes the current firmware.

According to an embodiment of the present invention, after the processor determines that the updated firmware is the same as the current firmware, the processor uses the second public key to verify the current firmware to determine whether the current firmware passes the verification, the processor executes the current firmware, the processor further determines whether the count value is the third value. When the count value is the third value, and the processor further determines whether the current firmware uses the second public key for verification.

According to an embodiment of the present invention, when the current firmware is verified using the second public key, the processor modifies the count value from the third value to the second value. When the current firmware uses the first public key for verification instead of the second public key, the processor does not modify the count value.

In another embodiment, a public key replacement method is provided, which comprises the following steps. A count value is counted. When the count value is a first value, a first public key is selected corresponding to the first value. When the count value is a second value, a second public key is selected corresponding to the second value. When the count value is a third value, the first public key and the second public key are selected. The first public key and the second public key are written to an immutable memory in advance and are immutable. The first value and the second value are in a first state, and the third value is in a second state. The first state and the second state are different.

According to an embodiment of the present invention, the public key replacement method further comprises the following steps. When the first public key corresponding to the first value is selected, a current firmware is verified using the first public key and it is determined whether the current firmware passes the verification. When it is determined that the current firmware passes the verification, the current firmware is executed. When it is determined that the current firmware does not pass the verification, the current firmware is not executed.

According to an embodiment of the present invention, the public key replacement method further comprises the following steps. After executing the current firmware, it is determined whether the count value is in the second state. When it is determined that the count value is not in the second state, it is further determined whether to replace the first public key. When it is determined to replace the first public key, an updated firmware is downloaded and the count value is modified from the first value to the third value. After the count value is modified to be the third value, a reboot is executed.

According to an embodiment of the present invention, the public key replacement method further comprises the following steps. After the step of executing the reboot, the public key replacement method further comprises the following steps. The first public key and the second public key are selected based on the count value being the third value. After the step of selecting the first public key and the second public key based on the count value being the third value, it is determined whether the updated firmware is the same as the current firmware. When it is determined that the updated firmware is not the same as the current firmware, the updated firmware is verified using the second public key and it is determined whether the updated firmware passes the verification.

According to an embodiment of the present invention, the public key replacement method further comprises the following steps. When it is determined that the updated firmware does not pass the verification, the current firmware is verified using the first public key and it is determined whether the current firmware passes the verification. When it is determined that the current firmware passes the verification, the current firmware is executed.

According to an embodiment of the present invention, the public key replacement method further comprises the following steps. When it is determined that the updated firmware passes the verification, the updated firmware is stored as the current firmware. After the step of storing the updated firmware as the current firmware, a reboot is executed. After the step of executing the reboot, the first public key and the second public key are selected based on the count value being the third value once again.

According to an embodiment of the present invention, the public key replacement method further comprises the following steps. The current firmware is stored at a first address of a non-volatile memory. The updated firmware is stored at a second address of the non-volatile memory. In the step of storing the updated firmware as the current firmware, the updated firmware of the second address is copied to the first address.

According to an embodiment of the present invention, the public key replacement method further comprises the following steps. After the step of executing the reboot and the step of selecting the first public key and the second public key based on the count value being the third value once again and when it is determined that the updated firmware is the same as the current firmware, the current firmware is verified using the second public key and it is determined whether the current firmware passes the verification. When it is determined that the current firmware passes the verification, the current firmware is executed.

According to an embodiment of the present invention, when it is determined that the updated firmware is the same as the current firmware and after the step of verifying the current firmware using the second public key and determining whether the current firmware passes the verification and the step of executing the current firmware, the public key replacement method further comprises the following steps. It is further determined whether the count value is the third value. When the count value is the third value, it is further determined whether the current firmware is verified using the second public key.

According to an embodiment of the present invention, the public key replacement method further comprises the following steps. When the current firmware is verified using the second public key, the count value is modified from the third value to the second value. When the current firmware is verified using the first public key instead of the second public key, the count value is not modified.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
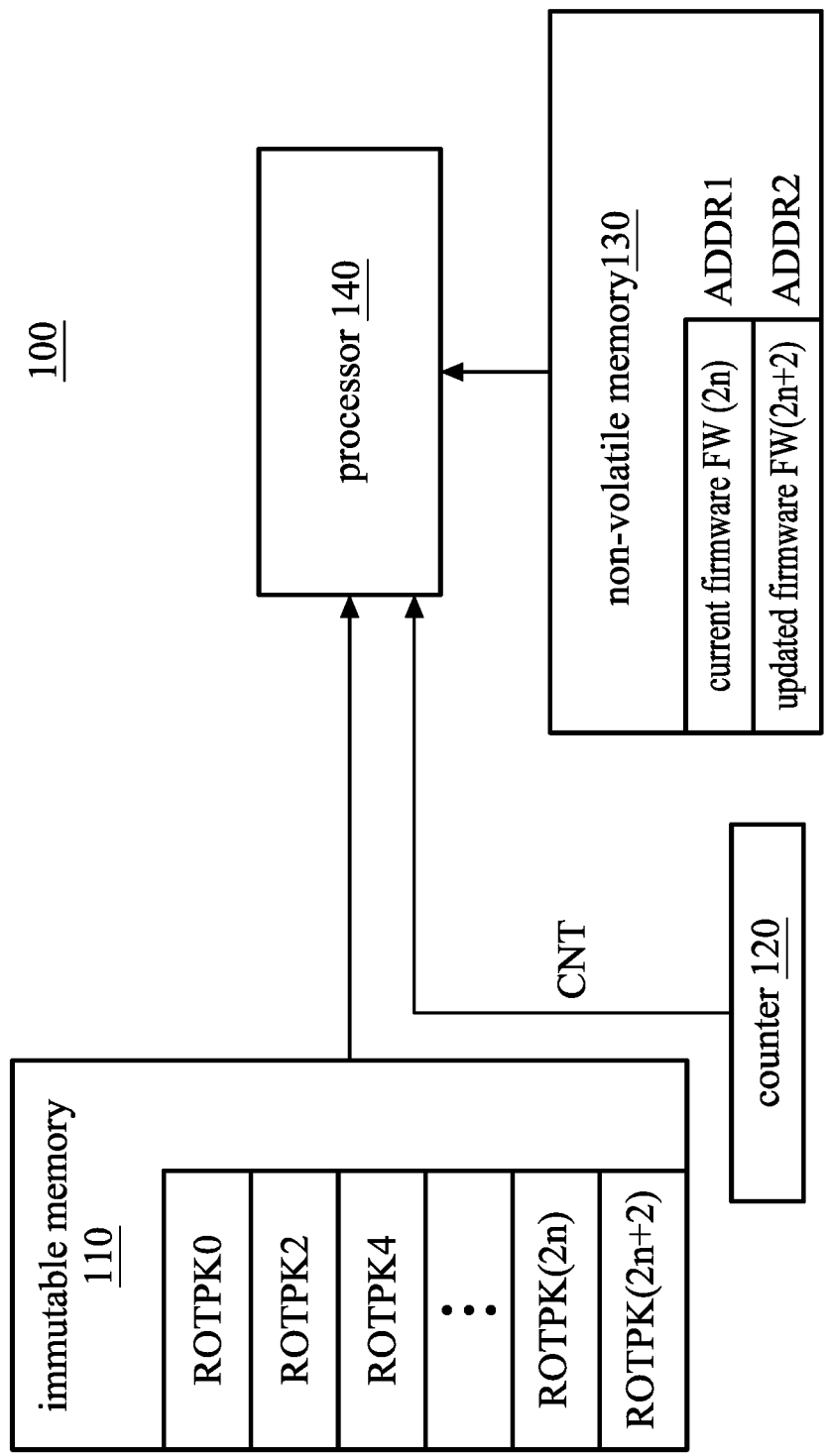
FIG. 1 is a block diagram illustrating an electronic device in accordance with an embodiment of the present invention.

The following description is made for the purpose of illustrating the general principles of the disclosure and should not be taken in a limiting sense. The scope of the disclosure is determined by reference to the appended claims.

In the following detailed description, for purposes of explanation, numerous specific details and embodiments are set forth in order to provide a thorough understanding of the present disclosure. The use of like and/or corresponding numerals in the drawings of different embodiments does not suggest any correlation between different embodiments.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

In addition, in this specification, relative spatial expressions are used. For example, "lower", "bottom", "higher" or "top" are used to describe the position of one element relative to another. It should be appreciated that if a device is flipped upside down, an element that is "lower" will become an element that is "higher".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section in the specification could be termed a second element, component, region, layer, portion or section in the claims without departing from the teachings of the present disclosure.

It should be understood that this description of the exemplary embodiments is intended to be read in connection with the accompanying drawings, which are to be considered part of the entire written description. The drawings are not drawn to scale. In addition, structures and devices are shown schematically in order to simplify the drawing.

The terms "approximately", "about" and "substantially" typically mean a value is within a range of +/−20% of the stated value, more typically a range of +/−10%, +/−5%, +/−3%, +/−2%, +/−1% or +/−0.5% of the stated value. The stated value of the present disclosure is an approximate value. Even there is no specific description, the stated value still includes the meaning of "approximately", "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

In the drawings, similar elements and/or features may have the same reference number. Various components of the same type can be distinguished by adding letters or numbers after the component symbol to distinguish similar components and/or similar features.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

FIG. 1 is a block diagram illustrating an electronic device in accordance with an embodiment of the present invention. As shown in FIG. 1, the electronic device 100 includes an immutable memory 110, a counter 120, a non-volatile memory 130, and a processor 140. The immutable memory 110 is configured to store the first public key ROTPK0, the second public key ROTPK2, the third public key ROTPK4 . . . the (n+1)-th public key ROTPK(2n), and the (n+2)-th public key ROTPK (2n+2).

According to some embodiments of the present invention, the immutable memory 110 is a one-time programmable (OTP) memory, and the first public key ROTPK0, the second public key ROTPK2, and the third public key ROTPK4 . . . the (n+1)-th public key ROTPK(2n) and the (n+2)-th public key ROTPK(2n+2) are both written into the immutable memory 110 in advance. When the second public key ROTPK2 is selected for firmware verification, the first public key ROTPK0 is revoked.

The counter 120 has anti-rollback protection and is configured to count the count value CNT. According to some embodiments of the present invention, the counter 120 is a non-volatile counter. In other words, when the electronic device 100 is powered off, the counter 120 will automatically record the count value CNT and prevent the countdown from occurring. For example, the count value CNT is continuously accumulated from 0, 1, 2, 3 . . . , and the anti-countdown protection prevents the count value CNT from returning to a previous value.

The non-volatile memory 130 includes a first address ADDR1 and a second address ADDR2. The first address ADDR1 is configured to store the current firmware FW(2n), and the second address ADDR2 is configured to store the updated firmware FW(2n+2). According to some embodiments of the present invention, the current firmware FW(2n) is the boot process currently executed by the electronic device 100, and the updated firmware FW(2n+2) is the boot process to be replaced by the electronic device 100. According to other embodiments of the present invention, when the updated firmware FW(2n+2) is configured as the current firmware of the electronic device 100, the updated firmware FW(2n+2) will be copied to the first address ADDR1.

Based on the count value CNT of the counter 120, the processor 140 selects one of the first public key ROTPK0, the second public key ROTPK2, the third public key ROTPK4, . . . , the (n+1)-th public key ROTPK(2n), and the (n+2)-th public key ROTPK(2n+2) based on the count value CNT, and use the corresponding public key to verify the current firmware FW(2n) and the updated firmware FW(2n+2).

For example, when the count value CNT is 2n, the processor 140 selects the (n+1)-th public key ROTPK(2n) and uses the (n+1)-th public key ROTPK(2n) to verify the current Firmware FW(2n). According to some embodiments of the present invention, when the electronic device 100 wants to change the public key, the processor 140 increases the count value CNT to 2n+1, and simultaneously selects the (n+1)-th public key ROTPK (2n) and the (n+2)-th Public key ROTPK(2n+2), and use the (n+1)-th public key ROTPK(2n) and the (n+2)-th public key ROTPK(2n+2) to verify the current firmware FW(2n) and the updated firmware FW(2n+2). When the electronic device 100 determines to use the updated firmware FW(2n+2), the processor 140 will copy the updated firmware FW(2n+2) to the first address ADDR1 and increase the count value CNT to 2n+2, so that the processor 140 then selects the (n+2)-th public key ROTPK (2n+2) based on the count value CNT, and revokes the (n+1)-th public key ROTPK(2n).

In other words, the processor 140 selects the corresponding public key to verify the firmware according to the count value CNT of the counter 120, and uses the corresponding public key to verify the current firmware FW(2n) and the updated firmware FW(2n+2). In addition, when it is determined to take the updated firmware as the current firmware, the count value CNT of the counter 120 increases once again, and a new public key is selected and the old public key is revoked. The processor 140 copies the updated firmware FW(2n+2) to the first address ADDR1 as a new current firmware.

According to some embodiments of the present invention, when the count value CNT is an even number, the processor 140 selects the corresponding public key based on the count value CNT of the counter 120 to verify the firmware; when the count value CNT is an odd number, The processor 140 selects the public key corresponding to the even numbers adjacent to the count value CNT to verify the firmware. According to other embodiments of the present invention, the public key may also correspond to an odd count value CNT. the public key corresponding to an even count value CNT is illustrated as an example for explanation and explanation herein, but not intended to be limited thereto.

Figure 2:
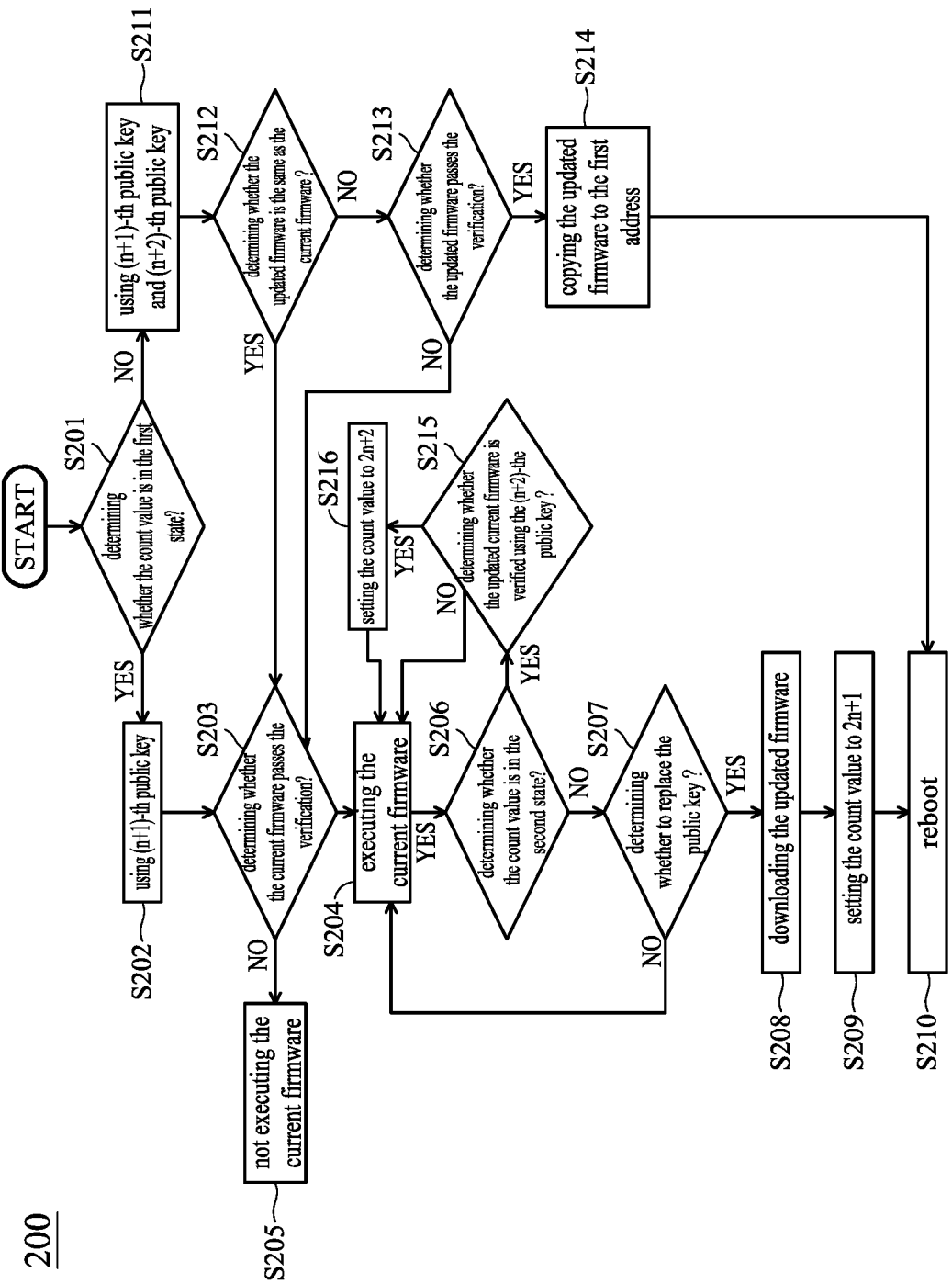
FIG. 2 is a flow chart illustrating a public key replacement method in accordance with an embodiment of the present invention.

FIG. 2 is a flow chart illustrating a public key replacement method in accordance with an embodiment of the present invention. The following description of the public key replacement method 200 will be combined with the block diagram in FIG. 1 to facilitate detailed explanation. According to some embodiments of the present invention, before executing the public key replacement method 200, the first public key ROTPK0, the second public key ROTPK2, the third public key ROTPK4, . . . , the (n+1)-th public key ROTPK(2n), and the (n+2)-th public key ROTPK(2n+2) has been pre-written into the immutable memory 110, and cannot be erased. In other words, before executing the public key replacement method 200, a plurality of public keys have already existed and cannot be modified.

First, the processor 140 determines whether the count value CNT is in the first state (Step S201). According to an embodiment of the present invention, the first state is an even number. In other words, in Step S201, the processor 140 determines whether the count value CNT is an even number. As shown in FIG. 1, it is illustrated herein as an example that any one of the first public key ROTPK0, the second public key ROTPK2, the third public key ROTPK4, . . . , the (n+1)-th public key ROTPK(2n), and the (n+2)-th the public keys ROTPK (2n+2) corresponds to a respective even count value CNT, but is not intended to be limited thereto.

When it is determined in Step S201 that the count value CNT is in the first state (i.e., an even number), the processor 140 selects the corresponding public key based on the count value CNT (Step S202). For example, when the count value CNT is 2n, the processor 140 selects the (n+1)-th public key ROTPK(2n), where n is an integer not less than zero. In the following paragraph, the count value CNT is illustrated as $2n$ for explanation.

Subsequently, the processor 140 uses the (n+1)-th public key ROTPK (2n) to verify the current firmware FW(2n), and determines whether the current firmware FW(2n) passes the verification (Step S203). According to an embodiment of the present invention, in Step S202, the processor 140 uses the (n+1)-th public key ROTPK(2n) to verify the current firmware FW(2n) and determines whether the current firmware FW(2n) passes the signature.

When it is determined in Step S203 that the current firmware FW(2n) passes the verification, the processor 140 executes the current firmware FW(2n) (Step S204). When it is determined in Step S203 that the current firmware FW(2n) has not passed the verification, it means that the current firmware FW(2n) may have been changed, so the processor 140 does not execute the current firmware FW(2n) (Step S205) to ensure the safety of the electronic device 100.

After Step S204, the processor 140 then determines whether the count value CNT is in the second state (Step S206). According to an embodiment of the invention, the second state is odd. In other words, in Step S206, the processor 140 determines whether the count value CNT is an odd number.

When it is determined in Step S206 that the count value CNT is not in the second state (i.e., an odd number), the processor 140 determines whether to replace the public key (Step S207). When it is determined in Step S207 that the public key is not to be replaced, the processor 140 returns to Step S204 and continues to execute the current firmware FW(2n). When it is determined in Step S207 that the public key is not to be replaced, the processor 140 downloads the updated firmware FW(2n+2) (Step S208). According to an embodiment of the present invention, the processor 140 downloads the updated firmware FW(2n+2) to the second address ADDR2 in FIG. 1.

Next, the processor 140 controls the counter 120 to increase the count value CNT by 1 (Step S209), so that the count value CNT is 2n+1. Subsequently, the processor 140 is rebooted (Step S210), so that the processor 140 re-executes the public key replacement method 200, and re-executes steps S201 once again.

When the processor 140 executes Step S201 once again, since the count value CNT increases to 2n+1 in Step S209, the processor 140 determines in Step S201 that the count value CNT is not in the first state (i.e., an even number), and the processor 140 simultaneously selects the (n+1)-th public key ROTPK(2n) and the (n+2)-th public key ROTPK(2n+2) (Step S211).

Next, the processor 140 determines whether the updated firmware FW(2n+2) is the same as the current firmware FW(2n) (Step S212). According to an embodiment of the present invention, since the updated firmware FW(2n+2) has just been downloaded to the second address ADDR2 in Step S208, the updated firmware FW(2n+2) is different from the current firmware FW(2n).

When it is determined in Step S212 that the updated firmware FW(2n+2) is not the same as the current firmware FW(2n), the processor 140 uses the (n+2)-th public key ROTPK(2n+2) to verify the updated firmware FW(2n+2), and determines whether the updated firmware FW(2n+2) passes the verification (Step S213).

When it is determined in Step S213 that the updated firmware FW(2n+2) passes the verification, the processor 140 copies the updated firmware FW(2n+2) to the first address ADDR1 (Step S214). After the processor 140 copies the updated firmware FW(2n+2) to the first address ADDR1, the processor 140 executes Step S210 and reboots once again, so that the processor 140 re-executes the public key replacement method 200 and executes Step S201 once again.

When it is determined in Step S213 that the updated firmware FW(2n+2) does not pass the verification, the processor 140 executes Step S203 to verify the current firmware FW(2n) with the (n+1)-th public key ROTPK (2n), and determines whether the current firmware FW(2n) passes the verification.

Figure 3:
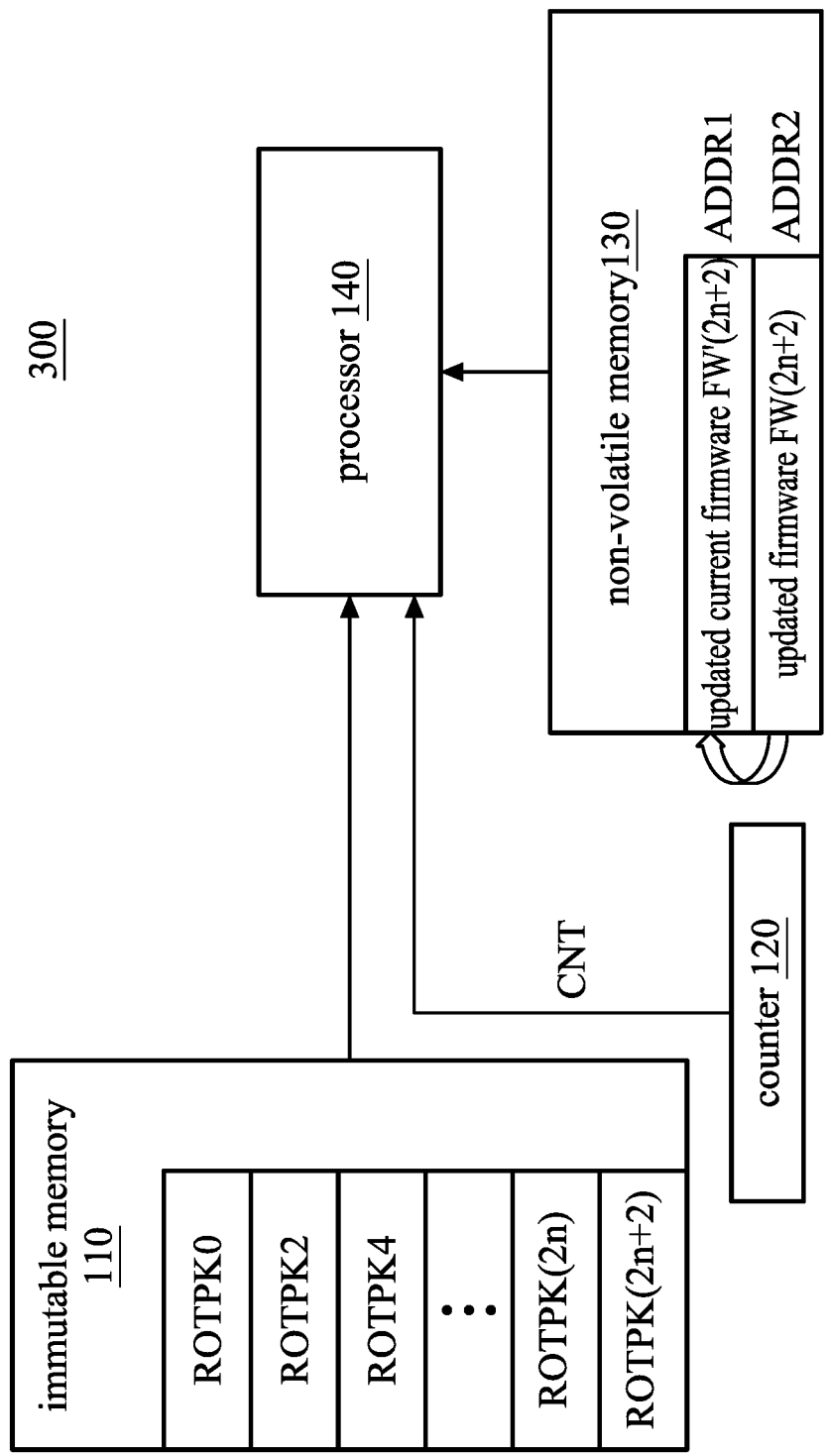
FIG. 3 is a block diagram illustrating an electronic device in accordance with another embodiment of the invention.

FIG. 3 is a block diagram illustrating an electronic device in accordance with another embodiment of the invention. As shown in FIG. 3, the first address ADDR1 of the electronic device 300 stores the updated current firmware FW'(2n+2), in which the updated current firmware FW'(2n+2) and the updated firmware FW(2n+2) are exactly the same, and they all correspond to the (n+2)-th public key ROTPK(2n+2). In other words, in Step S214, the processor 140 copies the updated firmware FW(2n+2) stored at the second address ADDR2 to the first address ADDR1 as the updated current firmware FW'(2n+2), and the updated current firmware FW'(2n+2) and the updated firmware FW(2n+2) are the same.

Returning to FIG. 2, when the processor 140 executes Step S201 once again, since the count value CNT is still 2n+1 at this time, the processor 140 then executes Step S211, and executes Step S212 to determine whether the updated firmware (2n+2) stored at the second address ADDR2 is the same as the updated current firmware FW'(2n+2) stored at the first address ADDR1. Since the updated firmware FW(2n+2) has been copied to the first address ADDR1 as the updated current firmware FW'(2n+2) in Step S213, the processor 140 determines in Step S212 that the updated firmware (2n+2) is the same as the updated current firmware FW'(2n+2), and then executes Step S203.

In Step S203, the processor 140 uses the (n+2) public key ROTPK(2n+2) to verify the updated current firmware FW'(2n+2) stored in the first address ADDR1, and determines whether the updated current firmware FW'(2n+2) passes the verification. When the processor 140 determines in Step S203 that the updated current firmware FW'(2n+2) passes the verification, the processor 140 executes the updated current firmware FW'(2n+2) in Step S204. When the processor 140 determines in Step S203 that the updated current firmware FW'(2n+2) passes the verification, the processor executes Step S205 without executing the updated current firmware FW'(2n+2).

After Step S204, the processor 140 executes Step S206 again to determine whether the count value CNT is the second state (i.e., an odd number). Since the count value CNT is still 2n+1, the processor 140 determines that the count value CNT is in the second state in Step S206.

Next, the processor 140 determines whether the updated current firmware FW'(2n+2) is verified using the (n+2)-th public key ROTPK(2n+2) (Step S215). When the processor 140 determines in Step S215 that the updated current firmware FW'(2n+2) is not verified using the (n+2)-th public key ROTPK(2n+2), the processor 140 returns to Step S204 and continues executing the updated current firmware FW'(2n+2).

When the processor 140 determines in Step S215 that the updated current firmware FW'(2n+2) is verified using the (n+2)-th public key ROTPK(2n+2), the processor 140 executes Step S216 to set the count value CNT to 2n+2. According to some embodiments of the present invention, the processor 140 controls the counter 120 to increase the count value CNT by 1, so that the count value CNT increases from 2n+1 to 2n+2. After Step S216, the processor 140 returns to Step S204 once again to continue executing the updated current firmware FW'(2n+2).

In other words, when the processor 140 returns to Step S204 again and executes the updated current firmware FW'(2n+2) in Step S204, it means that the processor 140 has replaces the (n+1)-th public key ROTPK(2n) with the (n+2)-th public key ROTPK(2n+2) and successfully replaces the current firmware FW(2n) with the updated current firmware FW'(2n+2). The (n+2)-th public key ROTPK(2n+2) is utilized to verify the current firmware FW(2n+2). In addition, since the processor 140 uses the (n+2)-th public key ROTPK (2n+2) for verification in the future, and the count value CNT has anti-countdown protection, the (n+1)-th public key ROTPK(2n) is automatically revoked.

An electronic device and a public key replacement method thereof is proposed herein, which breaks through the previous limitation that the public key cannot be changed. By pre-writing a plurality of public keys into a one-time programmable memory and using the count value counted by a counter with anti-countdown protection as an index, the electronic device can sequentially use the plurality of public keys pre-written into the write-once memory. In addition, the electronic device can use the public key replacement method proposed by the present invention to smoothly transfer from the previous public key and firmware to the updated public key and firmware. During the transfer process, since the previous public key and the updated public key can be used at the same time, even if the update fails caused by a problem occurring during the update process, the electronic device can still use the previous public key with the previous firmware to continue the boot-up process.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An electronic device, comprising:
   an immutable memory, storing a first public key and a second public key in advance, wherein the first public key and the second public key are unmodifiable;
   a counter, having an anti-rollback protection and counting a count value; and
   a processor, selecting the first public key, the second public key, or both, based on the count value;
   wherein when the count value is a first value, the processor selects the first public key corresponding to the first value;
   wherein when the count value is a second value, the processor selects the second public key corresponding to the second value;
   wherein when the count value is a third value, the processor selects the first public key and the second public key;
   wherein the third value is an average of the first value and the second value, and the second value exceeds the first value;
   wherein the first value and the second value are in a first state and the third value is in a second state;
   wherein the first state and the second state are different.

2. The electronic device as defined in claim 1, wherein when the processor selects the first public key corresponding to the first value, the processor uses the first public key to verify a current firmware and determines whether the firmware passes the verification;
   wherein when the processor determines whether the current firmware passes the verification, the processor executes the current firmware;
   wherein when the processor determines that the current firmware does not pass the verification, the processor does not execute the current firmware.

3. The electronic device as defined in claim 2, wherein after the processor executes the current firmware, the processor determines whether the count value is in the second state;
   wherein when the processor determines that the count value is not in the second state, the processor further determines whether to replace the first public key;
   wherein when the processor determines to replace the first public key, the processor downloads an updated firmware and controls the counter to modify the count value from the first value to the third value;
   wherein after the count value is modified to the third value, the processor reboots.

4. The electronic device as defined in claim 3, wherein after the processor reboots, the processor selects the first public key and the second public key based on the third value;
   wherein after the processor selects the first public key and the second public key based on the third value, the processor determines whether the updated firmware is the same as the current firmware;
   wherein when the processor determines that the updated firmware is not the same as the current firmware, the processor uses the second public key to verify the updated firmware and determines whether the updated firmware passes the verification.

5. The electronic device as defined in claim 4, wherein when the processor determines that the updated firmware does not pass the verification, the processor uses the first public key to verify the current firmware and determines whether the current firmware passes the verification;
   wherein when the processor determines the current firmware passes the verification, the processor executes the current firmware.

6. The electronic device as defined in claim 4, wherein when the processor determines that the updated firmware passes the verification, the processor stores the updated firmware as the current firmware;
   wherein after the processor stores the updated firmware as the current firmware, the processor reboots;
   wherein after the processor reboots, the processor selects the first public key and the second public key based on the count value being the third value.

7. The electronic device as defined in claim 6, further comprising:
   a non-volatile memory, comprising a first address and a second address;
   wherein the current firmware is stored in the first address;
   wherein the updated firmware is stored in the second address;
   wherein when the processor stores the updated firmware as the current firmware, the processor copies the updated firmware of the second address to the first address.

8. The electronic device as defined in claim 6, wherein after the processor reboots to select the first public key and the second public key based on the count value and when the processor determines that the updated firmware is the same as the current firmware, the processor uses the second public key to verify the current firmware and determines whether the current firmware passes the verification;
   wherein when the processor determines that the current firmware passes the verification, the processor executes the current firmware.

9. The electronic device as defined in claim 8, wherein after the processor determines that the updated firmware is the same as the current firmware, the processor uses the second public key to verify the current firmware to determine whether the current firmware passes the verification, the processor executes the current firmware, and the processor further determines whether the count value is the third value;
   wherein when the count value is the third value, the processor further determines whether the current firmware uses the second public key for verification.

10. The electronic device as defined in claim 9, wherein when the current firmware is verified using the second public key, the processor modifies the count value from the third value to the second value;
    wherein when the current firmware uses the first public key for verification instead of the second public key, the processor does not modify the count value.

11. A public key replacement method, comprising:
    counting a count value;
    when the count value is a first value, selecting a first public key corresponding to the first value;

when the count value is a second value, selecting a second public key corresponding to the second value; and when the count value is a third value, selecting the first public key and the second public key;

wherein the first public key and the second public key are written to an immutable memory in advance and are immutable;

wherein the first value and the second value are in a first state, and the third value is in a second state;

wherein the first state and the second state are different.

12. The public key replacement method as defined in claim 11, further comprising:

when the first public key corresponding to the first value is selected, verifying a current firmware using the first public key and determining whether the current firmware passes the verification;

when it is determined that the current firmware passes the verification, executing the current firmware; and when it is determined that the current firmware does not pass the verification, not executing the current firmware.

13. The public key replacement method as defined in claim 12, further comprising:

after executing the current firmware, determining whether the count value is in the second state;

when it is determined that the count value is not in the second state, further determining whether to replace the first public key;

when it is determined to replace the first public key, downloading an updated firmware and modifying the count value from the first value to the third value; and after the count value is modified to be the third value, executing a reboot.

14. The public key replacement method as defined in claim 13, wherein after the step of executing the reboot, the public key replacement method further comprises:

selecting the first public key and the second public key based on the count value being the third value;

after the step of selecting the first public key and the second public key based on the count value being the third value, determining whether the updated firmware is the same as the current firmware; and when it is determined that the updated firmware is not the same as the current firmware, verifying the updated firmware using the second public key and determining whether the updated firmware passes the verification.

15. The public key replacement method as defined in claim 14, further comprising:

when it is determined that the updated firmware does not pass the verification, verifying the current firmware using the first public key and determining whether the current firmware passes the verification; and when it is determined that the current firmware passes the verification, executing the current firmware.

16. The public key replacement method as defined in claim 14, further comprising:

when it is determined that the updated firmware passes the verification, storing the updated firmware as the current firmware;

after the step of storing the updated firmware as the current firmware, executing the reboot; and after the step of executing the reboot, selecting the first public key and the second public key based on the count value being the third value once again.

17. The public key replacement method as defined in claim 16, further comprising:

storing the current firmware at a first address of a non-volatile memory;

storing the updated firmware at a second address of the non-volatile memory; and in the step of storing the updated firmware as the current firmware, copying the updated firmware of the second address to the first address.

18. The public key replacement method as defined in claim 16, further comprising:

after the step of executing the reboot and the step of selecting the first public key and the second public key based on the count value being the third value once again and when it is determined that the updated firmware is the same as the current firmware, verifying the current firmware using the second public key and determining whether the current firmware passes the verification; and when it is determined that the current firmware passes the verification, executing the current firmware.

19. The public key replacement method as defined in claim 18, wherein when it is determined that the updated firmware is the same as the current firmware and after the step of verifying the current firmware using the second public key and determining whether the current firmware passes the verification and the step of executing the current firmware, the public key replacement method further comprises:

further determining whether the count value is the third value; and when the count value is the third value, further determining whether the current firmware is verified using the second public key.

20. The public key replacement method as defined in claim 19, further comprising:

when the current firmware is verified using the second public key, modifying the count value from the third value to the second value; and when the current firmware is verified using the first public key instead of the second public key, not modifying the count value.

* * * * *